(12) United States Patent
Kuwahara et al.

(10) Patent No.: US 11,428,539 B2
(45) Date of Patent: Aug. 30, 2022

(54) RECOMMENDATION APPARATUS AND RECOMMENDATION SYSTEM

(71) Applicant: DENSO CORPORATION, Kariya (JP)

(72) Inventors: Hiroshi Kuwahara, Kariya (JP); Yousuke Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 137 days.

(21) Appl. No.: 16/852,626

(22) Filed: Apr. 20, 2020

(65) Prior Publication Data

US 2020/0340818 A1    Oct. 29, 2020

(30) Foreign Application Priority Data

Apr. 24, 2019 (JP) .............................. JP2019-083017

(51) Int. Cl.
*G01C 21/34* (2006.01)
*G01C 21/36* (2006.01)

(52) U.S. Cl.
CPC ....... *G01C 21/343* (2013.01); *G01C 21/3476* (2013.01); *G01C 21/3484* (2013.01); *G01C 21/3617* (2013.01); *G01C 21/3679* (2013.01)

(58) Field of Classification Search
CPC .............. G01C 21/343; G01C 21/3461; G01C 21/3476; G01C 21/3484; G01C 21/3617; G01C 21/3679; G01C 21/3682; G01C 21/3685; H04W 4/021
See application file for complete search history.

(56) References Cited

U.S. PATENT DOCUMENTS

2019/0311014 A1    10/2019    Sugawara

FOREIGN PATENT DOCUMENTS

| JP | 2013-181908 A | 9/2013 |
| JP | 2014-157092 A | 8/2014 |
| JP | 2014-157093 A | 8/2014 |
| JP | 2014-199212 A | 10/2014 |
| WO | WO-2018/037446 A1 | 3/2018 |

*Primary Examiner* — Spencer D Patton
(74) *Attorney, Agent, or Firm* — Harness, Dickey & Pierce, P.L.C.

(57) ABSTRACT

A recommendation apparatus comprises a destination acquisition portion, a storage device, a stopover place extraction section, a user number extraction section, a recommendation degree calculation section, and a selection section. The storage device stores, for each of a plurality of visit places visited by a plurality of users in past, a total number of visit users which is a total number of users who have visited the visit place, and store, for each of one or more stopover places visited by the users after having visited the visit place, a total number of stopover users which is a total number of users who have visited the stopover place after having visited the visit place.

6 Claims, 8 Drawing Sheets

RECOMMENDATION APPARATUS AND RECOMMENDATION SYSTEM

CROSS REFERENCE TO RELATED APPLICATION

The present application is based on Japanese Patent Application No. 2019-083017 filed on Apr. 24, 2019, the disclosure of which is incorporated herein by reference.

TECHNICAL FIELD

The present disclosure relates to a recommendation apparatus and a recommendation system for recommending a visiting place to a user.

BACKGROUND

A related art describes a navigation system that presents a point which is relatively high in movement frequency (may be referred to a movement chance) between the point and a guidance reference point to a target user as a recommendation point based on movement history data in which movement histories between points of multiple users are recorded.

SUMMARY

The present disclosure describes a recommendation apparatus comprising a destination acquisition portion, a storage device, a stopover place extraction section, a user number extraction section, a recommendation degree calculation section, and a selection section.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
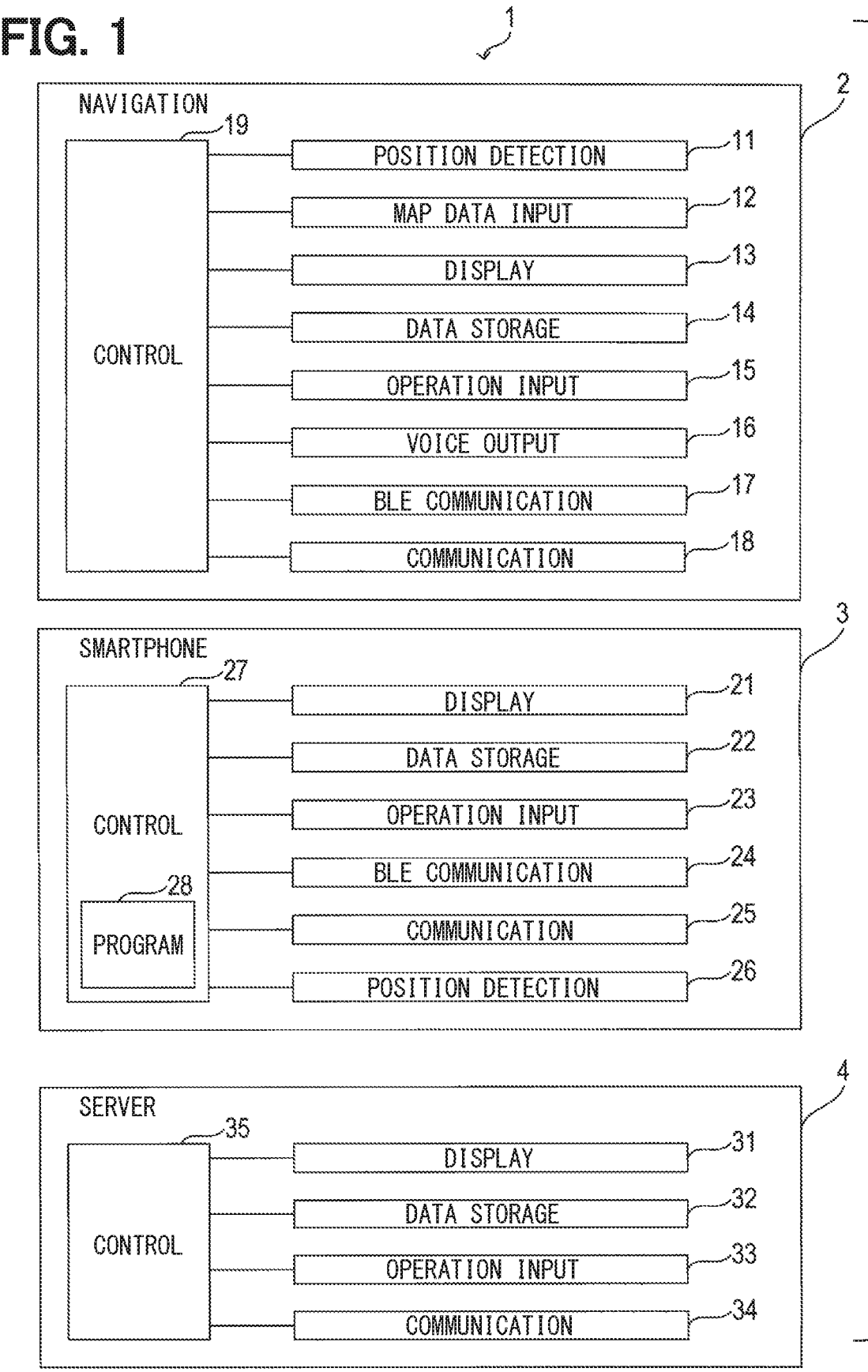
FIG. 1 is a block diagram showing a configuration of a recommendation system.

Since the recommendation point in a related art is selected with emphasis on the movement frequency between the recommendation point and the guidance reference point, there may be a case where a point useful for the user is not presented as the recommendation point in some cases.

The present disclosure may improve the likelihood of recommending a visit place that is useful to a user.

According to one aspect of the present disclosure, a recommendation apparatus may comprise a destination acquisition portion, a storage device, a stopover place extraction section, a user number extraction section, a recommendation degree calculation section, and a selection section.

The destination acquisition portion is configured to acquire destination information indicative of a destination of a user.

The storage device is configured to store, for each of a plurality of visit places visited by a plurality of users in the past, a total number of visitors which is a total number of users who have visited the visit place, and store, for each of one or more stopover places visited by the users after having visited the visit place, a total number of stopover users which is a total number of users who have visited the stopover place after having visited the visit place.

The stopover place extraction section is configured to extract, as a candidate stopover place, the stopover place associated with a destination visit place as the visit place, which is identical with the destination indicated by the acquired destination information.

The user number extraction section is configured to extract a total number of visitors of one or more of stopover candidate visit places from the storage device, the stopover candidate visit place being the visit place which is identical with the stopover place associated with the destination visit place among the plurality of visit places, and extract a total number of stopover users of one or more of the candidate stopover places from the storage device.

The recommendation degree calculation section is configured to calculate, for each of the one or more candidate stopover places, a popularity spot score based on the total number of visitors extracted by the user number extraction section, the popularity spot score indicating a degree to which the plurality of users have visited the candidate stopover places, calculate a through-point spot score based on the total number of stopover users extracted by the user number extraction section, the through-point spot score indicating a degree to which the plurality of users have visited the candidate stopover places through the destination visit places, and calculate a recommendation degree based on the calculated popularity spot score and the calculated through-point spot score, the recommendation degree indicating a degree of recommending the candidate stopover place to the user who visit the destination visit place.

The selection section is configured to select the one or more candidate stopover places as the stopover place to be recommended to the user, based on the one or more recommendation degrees calculated by the recommendation degree calculation section.

The recommendation apparatus configured as described above according to the present disclosure selects the stopover place recommended to the user, in consideration of not only the frequency at which the multiple users have stopped at the candidate stopover place through the destination visit place, but also the frequency at which the multiple users have visited the candidate stopover place (that is, the popularity of the candidate stopover place) regardless of whether the users have passed through the destination visit place. For that reason, the recommendation apparatus according to the present disclosure often recommends a highly popular stopover place, and can increase the frequency at which the user is glad to stopover at the stopover place recommended by the recommendation apparatus. As a result, the recommendation apparatus according to the present disclosure can improve the possibility of recommending a visit place useful to the user.

According to another aspect of the present disclosure, a recommendation system may comprises a mobile terminal, and a recommendation apparatus performing a data communication with the mobile terminal. The recommendation apparatus may comprise a destination acquisition portion, a storage device, a stopover place extraction section, a user number extraction section, a recommendation degree calculation section, a selection section, and a recommendation transmission section.

The destination acquisition portion is configured to acquire destination information indicative of a destination of a user.

The storage device is configured to store, for each of a plurality of visit places visited by a plurality of users in the past, a total number of visitors which is a total number of users who have visited the visit place, and store, for each of one or more stopover places visited by the users after having visited the visit place, a total number of stopover users which is a total number of users who have visited the stopover place after having visited the visit place.

The stopover place extraction section is configured to extract, as a candidate stopover place, the stopover place associated with a destination visit place as the visit place, which is identical with the destination indicated by the acquired destination information.

The user number extraction section is configured to extract a total number of visitors of one or more of stopover candidate visit places from the storage device, the stopover candidate visit place being the visit place which is identical with the stopover place associated with the destination visit place among the plurality of visit places, and extract a total number of stopover users of one or more of the candidate stopover places from the storage device.

The recommendation degree calculation section is configured to calculate, for each of the one or more candidate stopover places, a popularity spot score based on the total number of visitors extracted by the user number extraction section, the popularity spot score indicating a degree to which the plurality of users have visited the candidate stopover places, calculate a through-point spot score based on the total number of stopover users extracted by the user number extraction section, the through-point spot score indicating a degree to which the plurality of users have visited the candidate stopover places through the destination visit places, and calculate a recommendation degree based on the calculated popularity spot score and the calculated through-point spot score, the recommendation degree indicating a degree of recommending the candidate stopover place to the user who visit the destination visit place.

The selection section is configured to select the one or more candidate stopover places as the stopover place to be recommended to the user, based on the one or more recommendation degrees calculated by the recommendation degree calculation section.

The recommendation transmission section is configured to transmit recommendation information indicating the candidate stopover place selected by the selection section to the mobile terminal by the data communication.

Since the recommendation system according to the present disclosure configured as described above includes the recommendation apparatus of the present disclosure, the same effects as those of the recommendation apparatus of the present disclosure can be obtained.

Embodiments of the present disclosure will be described with reference to the drawings.

As shown in FIG. 1, a recommendation system 1 according to the present embodiment includes a navigation apparatus 2, a smartphone 3, and a server 4.

The navigation apparatus 2 is mounted on a vehicle and includes a position detection portion 11, a map data input device 12, a display device 13, a data storage device 14, an operation input portion 15, a voice output device 16, a BLE communication portion 17, a communication portion 18, and a control device 19.

The position detection portion 11 includes a GPS receiver that receives a satellite signal from a GPS satellite, and detects a position of the navigation apparatus 2 based on the signal received from the GPS satellite. The GPS is an abbreviation for Global Positioning System.

The map data input device 12 is a device for inputting various data stored in a map recording medium (not shown). The map recording medium stores map data (for example, node data, link data, cost data, road data, terrain data, mark data, intersection data, pause point data, facility data, or the like). Examples of the recording medium for storing the above data include a hard disk, a memory card, and the like.

The display device 13 is a display device for displaying various images on a display screen. The data storage device 14 is a storage device for storing various data.

The operation input portion 15 includes a touch panel installed on the display screen of the display device 13, and a switch installed around the display screen of the display device 13. The operation input portion 15 outputs input operation information for identifying an input operation performed by the user through a touch panel and a switch.

The voice output device 16 is installed in a vehicle compartment, and notifies an occupant of the vehicle of various types of information by voice.

The BLE communication portion 17 performs a short-range wireless communication by a method based on BLE, which is an extended specification of Bluetooth. The Bluetooth is a registered trade mark. The BLE is an abbreviation for Bluetooth Low Energy.

The communication portion 18 performs a data communication with the server 4 through a communication network of cellular phones.

The control device 19 is an electronic control device mainly including a microcomputer having a CPU, a ROM, a RAM, and the like. Various functions of the microcomputer are realized by causing the CPU to execute a program stored in a non-transitory tangible storage medium. In this example, the ROM corresponds to a non-transitory tangible storage medium in which the program is stored. A method corresponding to the program is executed by executing the program. A part or all of the functions to be executed by the CPU may be configured as hardware by one or multiple ICs or the like. The number of microcomputers configuring the control device 19 may be one or multiple.

The control device 19 executes various processes based on inputs from the position detection portion 11, the map data input device 12, the data storage device 14, the operation input portion 15, the BLE communication portion 17, and the communication portion 18, and controls the display device 13, the data storage device 14, the audio output device 16, the BLE communication portion 17, and the communication portion 18.

The control device 19 executes a current position display process for displaying the current position of the vehicle on the display screen of the display device 13. When the input operation information for setting the destination is input from the operation input portion 15, the control device 19 executes a route guidance process for guiding a route from the current position to the destination.

The smartphone 3 includes a display device 21, a data storage device 22, an operation input portion 23, a BLE communication portion 24, a communication portion 25, and a control device 27.

The display device 21 is a display device for displaying various images on a display screen. The data storage device 22 is a storage device for storing various data.

The operation input portion 23 includes a touch panel installed on the display screen of the display device 21, and a switch installed around the display screen of the display device 21. The operation input portion 23 outputs input operation information for identifying an input operation performed by the user through the touch panel and the switch.

The BLE communication portion 24 performs a short-range wireless communication by a method based on the BLE. The communication portion 25 performs a data communication with the server 4 through the communication network of the cellular phones.

The position detection portion 26 includes a GPS receiver that receives the satellite signal from the GPS satellite, and detects the position of the smartphone 3 based on the signal received from the GPS satellite.

The control device 27 is an electronic control device mainly including a microcomputer having a CPU, a ROM, a RAM, and the like. Various functions of the microcomputer are realized by causing the CPU to execute a program stored in a non-transitory tangible storage medium. In this example, the ROM corresponds to a non-transitory tangible storage medium in which the program is stored. A method corresponding to the program is executed by executing the program. A part or all of the functions to be executed by the CPU may be configured as hardware by one or multiple ICs or the like. The number of microcomputers configuring the control device 27 may be one or multiple.

The control device 27 executes various processes based on inputs from the data storage device 22, the operation input portion 23, the BLE communication portion 24, and the communication portion 25, and controls the display device 21, the data storage device 22, the BLE communication portion 24, and the communication portion 25.

The ROM of the control device 27 stores a destination setting application program 28 for determining a destination and transmitting the determined destination to the navigation apparatus 2 to set the destination. The destination setting application program 28 is executed by an input operation performed by the user of the smartphone 3 through the operation input portion 23 to start the destination setting application, whereby the destination determination process and the destination transmission process become executable. In other words, when the input operation information for executing the destination determination process is input from the operation input portion 23 after the destination setting application has started, the control device 27 executes the destination determination process. When the input operation information for executing the destination transmission process is input from the operation input portion 23 after the destination setting application has started, the control device 27 executes the destination transmission process.

In the destination determination process, a map is displayed on the display screen of the display device 21, a destination candidate list is displayed by searching for a destination, and the destination is determined based on the input operation information from the operation input portion 23. In the destination transmission process, destination data indicating a position indicating the position of the destination determined in the destination determination process is transmitted from the BLE communication portion 24 to the navigation apparatus 2. The navigation apparatus 2 that has received the destination data sets a position indicated by the destination data as a destination, and executes a route guidance process for guiding a route to the destination.

The server 4 includes a display device 31, a data storage device 32, an operation input portion 33, a communication portion 34, and a control device 35.

The display device 31 is a display device for displaying various images on a display screen. The data storage device 32 is a storage device for storing various data.

The operation input portion 33 includes a keyboard and a mouse (not shown). The operation input portion 33 outputs input operation information for identifying an input operation performed by the user through the keyboard and the mouse.

The communication portion 34 performs a data communication with the navigation apparatus 2 and the smartphone 3 through the communication network of the cellular phones.

The control device 35 is an electronic control device mainly including a microcomputer having a CPU, a ROM, a RAM, and the like. Various functions of the microcomputer are realized by causing the CPU to execute a program stored in a non-transitory tangible storage medium. In this example, the ROM corresponds to a non-transitory tangible storage medium in which the program is stored. A method corresponding to the program is executed by executing the program. A part or all of the functions to be executed by the CPU may be configured as hardware by one or multiple ICs or the like. The number of microcomputers configuring the control device 35 may be one or multiple.

The control device 35 executes various processes based on inputs from the data storage device 32, the operation input portion 33, and the communication portion 34, and controls the display device 31, the data storage device 32, and the communication portion 34.

A procedure of the departure place transmission process executed by the control device 27 of the smartphone 3 will be described. The departure place transmission process is a process repeatedly executed after the destination setting application has started.

Figure 2:
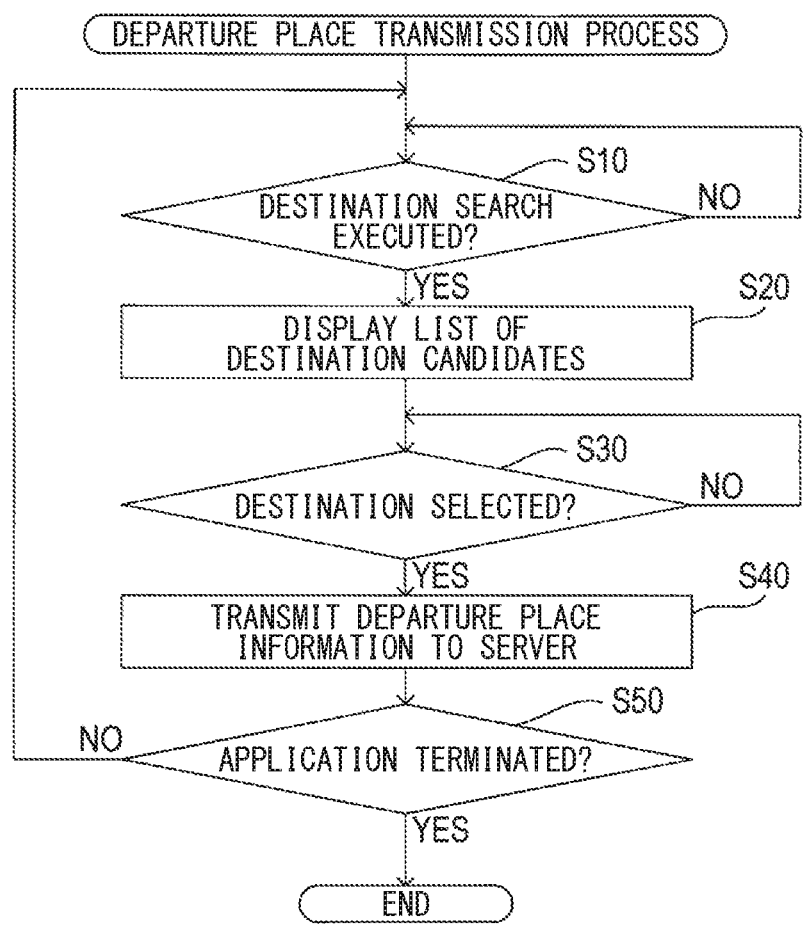
FIG. 2 is a flowchart showing a departure place transmission process.

With the execution of the departure place transmission process, first, in S10, the control device 27 determines whether the destination setting application executes the destination search and the destination search is completed, as shown in FIG. 2. In this example, when the destination search is not executed or when the destination search is being executed, the control device 27 repeats the processing in S10, to thereby wait until the destination setting application executes the destination search, and the destination search is completed.

When the destination search has been completed, in S20, the control device 27 displays a destination candidate list indicating one or more destination candidates on the display screen of the display device 21 based on the result of the destination search.

Thereafter, in S30, the control device 27 determines whether a destination has been selected from one or more destination candidates based on the input operation information input from the operation input portion 23. If the destination has not been selected, the control device 27 repeats the processing in S30 to wait until the destination is selected. Then, when the destination is selected, in S40, the control device 27 transmits user identification information for identifying the user of the smartphone 3 and departure place information indicating the current position of the smartphone 3 and current time from the communication portion 25 to the server 4. The current time includes not only the hour and minute but also the year, month, and day.

In S50, the control device 27 determines whether the destination setting application has been terminated. If the destination setting application is not terminated, the control device 27 proceeds to S10. When the destination setting application has been terminated, the control device 27 terminates the departure place transmission process.

The procedure of the departure place accumulation process executed by the control device 35 of the server 4 will be described. The departure place accumulation process is executed by causing an input operation for starting the departure place accumulation process to be performed by the user through the operation input portion 33.

Figure 3:
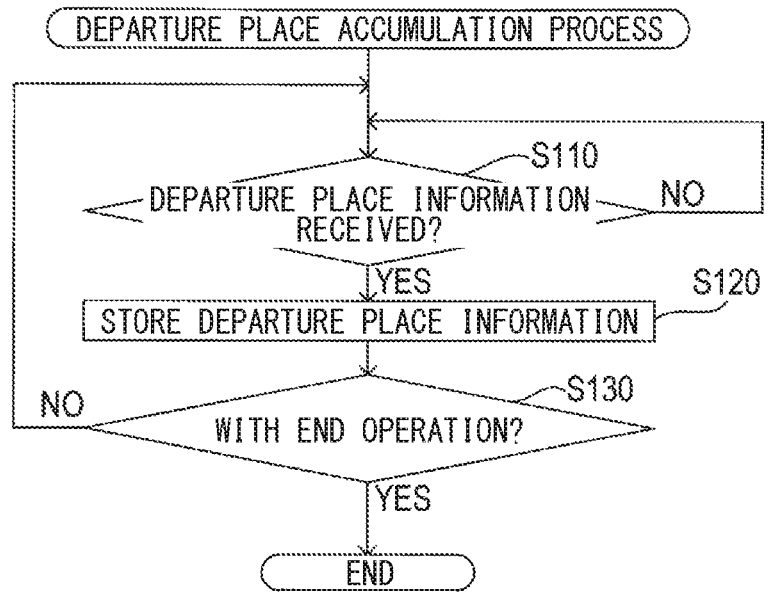
FIG. 3 is a flowchart showing a departure place accumulation process.

When the departure place accumulation process has been executed, the control device 35 first determines whether the departure place information has been received in S110, as shown in FIG. 3. If the departure place information has not been received, the control device 35 repeats the processing in S110 to wait until the departure place information is received. When the departure place information has been received, the control device 35 stores the received departure place information in the data storage device 32 in S120. In S130, the control device 35 determines whether an input operation for terminating the departure place accumulation process (referred to as a first server end operation) has been performed by the user through the operation input portion 33. In this example, when the first server end operation has not been performed, the control device 35 proceeds to S110. When the first server end operation has been performed, the control device 35 terminates the departure place accumulation process.

The procedure of the arrival place transmission process executed by the control device 19 of the navigation apparatus 2 will be described. The arrival place transmission process is a process executed after a power has been supplied to the control device 19 and the control device 19 has started.

Figure 4:
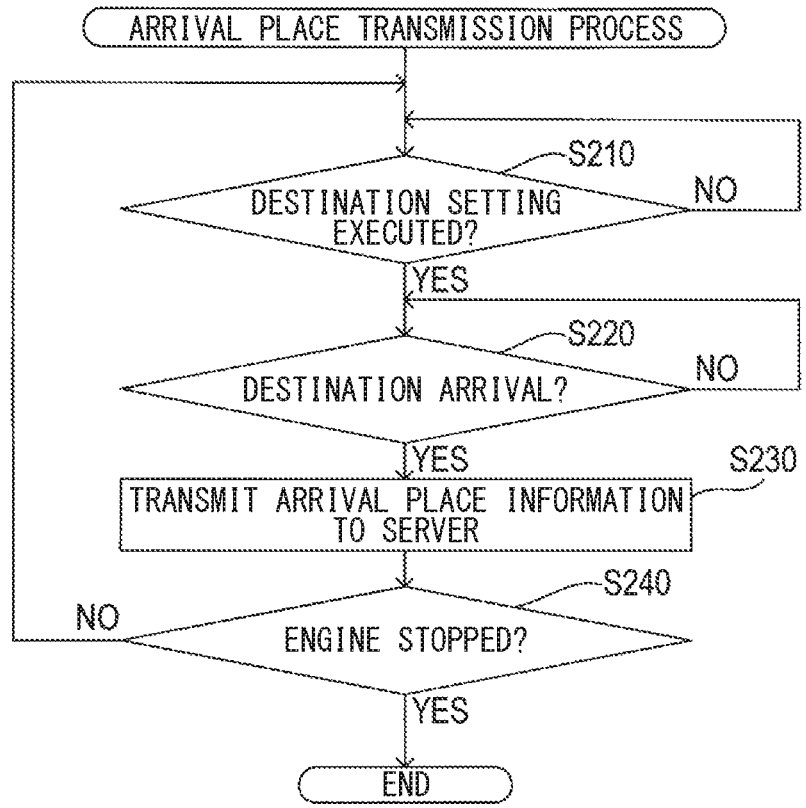
FIG. 4 is a flowchart showing an arrival place transmission process.

When the arrival place transmission process has been executed, the control device 19 first determines whether the arrival place setting has been executed in the navigation apparatus 2, and the destination setting has been completed in S210, as shown in FIG. 4. In this example, when the destination setting has not been executed, or when the destination setting is being executed, the control device 19 waits until the destination setting is completed by repeating the processing in S210.

When the destination setting has been completed, the control device 19 determines whether the vehicle equipped with the navigation apparatus 2 has arrived at the destination based on the detection result of the position detection portion 11 in S220. If the vehicle has not arrived at the destination, the control device 19 repeats the processing in S220 to wait until the vehicle arrives at the destination. Then, when the vehicle has arrived at the destination, the control device 19 transmits the user identification information for identifying the user of the navigation apparatus 2, and the arrival place information indicating the name of the destination (that is, the name of the arrival place), the position of the destination (that is, the position of the arrival place) and an arrival time from the communication portion 18 to the server 4 in S230. Incidentally, the arrival time includes not only the hour and minute but also the year, month, and day. The user identification information for identifying the user of the smartphone 3 and the user identification information for identifying the user of the navigation apparatus 2 are the same.

The control device 19 determines whether an engine of the vehicle on which the navigation apparatus 2 is mounted is stopped in S240. If the engine is not stopped, the control device 19 proceeds to S210. When the engine is stopped, the control device 19 ends the arrival place transmission process.

The procedure of the arrival place accumulation process executed by the control device 35 of the server 4 will be described. The arrival place accumulation process is executed by causing an input operation for starting the arrival place accumulation process to be performed by the user through the operation input portion 33.

Figure 5:
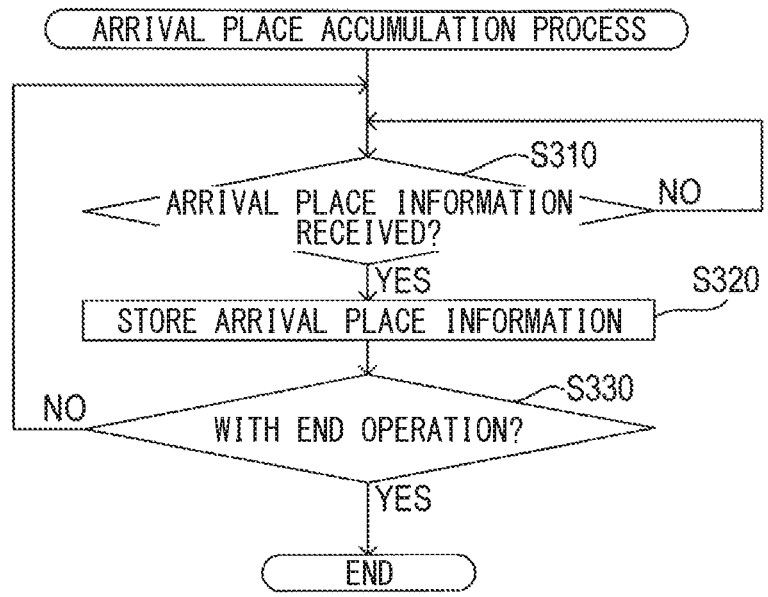
FIG. 5 is a flowchart showing an arrival place accumulation process.

When the arrival place accumulation process is executed, the control device 35 first determines whether the arrival place information has been received in S310, as shown in FIG. 5. In this example, when the arrival place information has not been received, the control device 35 waits until the arrival place information is received by repeating the processing in S310. Then, when the arrival place information has been received, the control device 35 stores the received arrival place information in the data storage device 32 in S320.

The control device 35 determines whether an input operation (referred to as a second server end operation) for terminating the arrival place accumulation process has been performed by the user through the operation input portion 33, in S330. In this example, when the second server end operation has not been performed, the control device 35 proceeds to S310. When the second server end operation has been performed, the control device 35 ends the arrival place accumulation process.

The procedure of the recommendation generation process executed by the control device 35 of the server 4 will be described. The recommendation generation process is executed by causing an input operation for starting the recommendation generation process to be performed by the user through the operation input portion 33.

Figure 6:
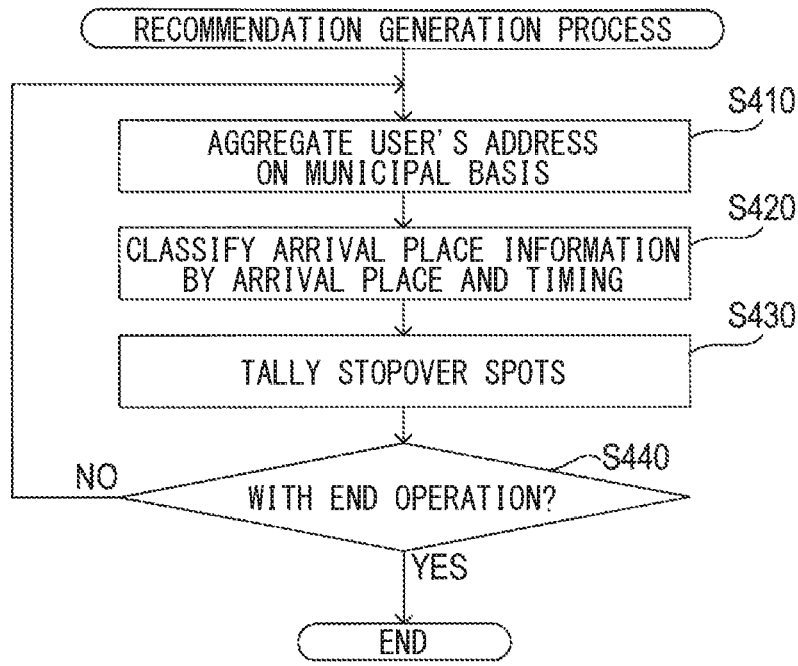
FIG. 6 is a flowchart showing a recommendation generation process.

When the recommendation generation process has been executed, the control device 35 first aggregates the addresses of the multiple users registered in the servers 4 in units of municipalities in S410, as shown in FIG. 6. Specifically, the control device 35 first stores the user identification information for identifying the multiple users in municipality unit folders corresponding to the addresses of the users. In the server 4, the addresses of the users and the user identification information are registered in association with each other for the multiple users. The multiple municipality unit folders are provided in the data storage device 32. For example, the municipality unit folders A1, A2, and A3 of FIG. 7 store the user identification information in "Okazaki-shi, Aichi," "Anjo-shi, Aichi," and "Minato-ku, Nagoya-shi, Aichi," respectively. Then, the control device 35 tallies the number of pieces of user identification information stored in each of the multiple municipality unit folders, and stores the tallied values in association with the corresponding folders.

As shown in FIG. 6, the control device 35 classifies the arrival place information accumulated in the data storage device 32 for each of the municipality unit folders according to the arrival place and the timing in S420.

Figure 7:
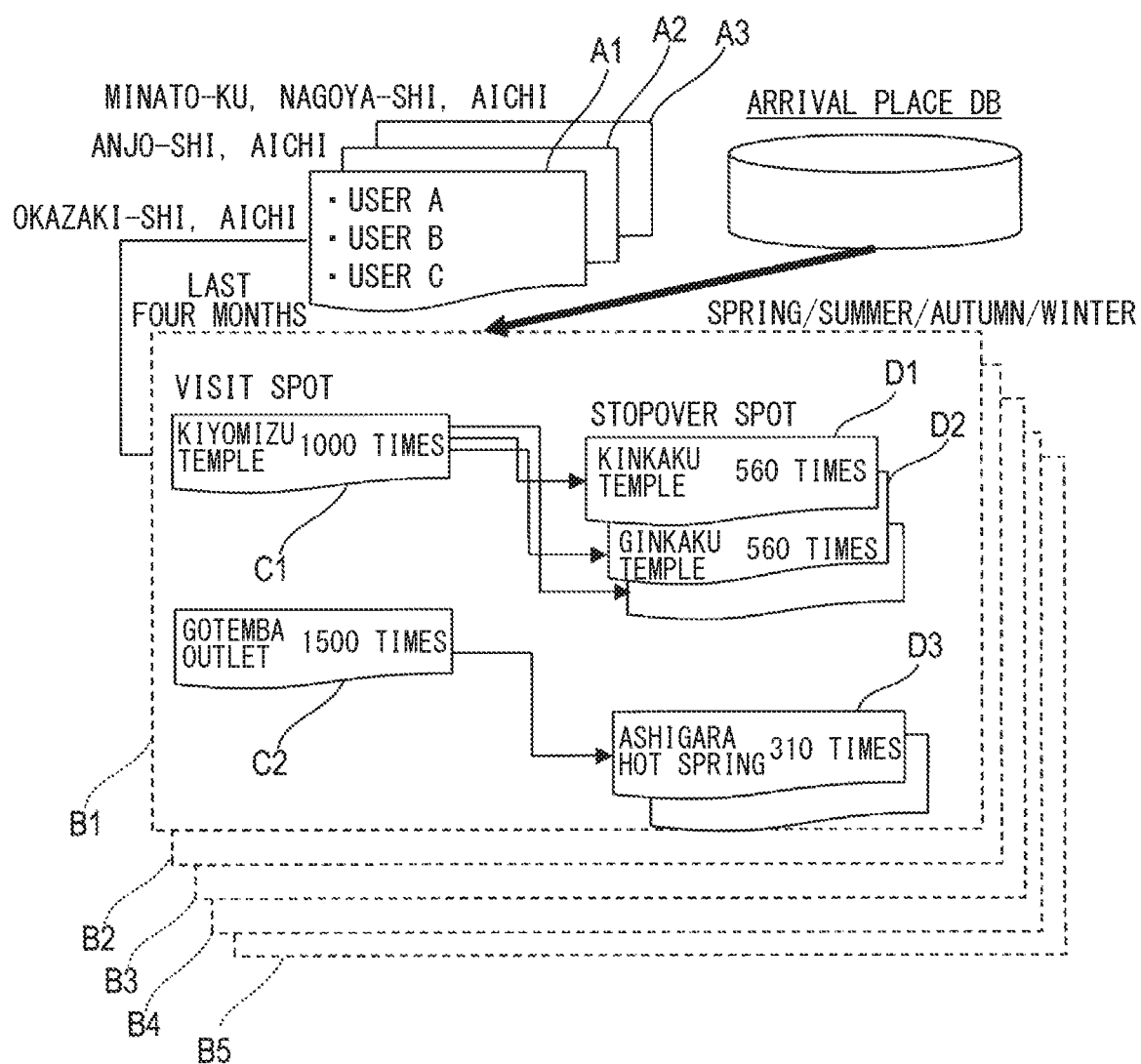
FIG. 7 is a diagram illustrating the classification of arrival place information.

Specifically, five timing classification folders are provided in the municipality unit folders for each of the five periods of the last four months, spring (spring season), summer (summer season), autumn (autumn season), and winter (winter season). For example, the timing classification folders B1, B2, B3, B4, and B5 of FIG. 7 are folders provided in the municipality unit folder A1 of "Okazaki-shi, Aichi". The timing classification folders B1, B2, B3, B4, and B5 are folders for classifying the arrival place in the last four months, spring, summer, fall, and winter, respectively. Incidentally, spring is from March to May, summer from June to August, autumn from September to November, and winter from December to February.

The control device 35 stores the arrival place information in at least one of the five timing classification folders in the corresponding municipality unit folder based on the user identification information and the arrival time indicated by the arrival place information.

The control device 35 stores the arrival place information in the corresponding visit spot folder based on the arrival place indicated by the arrival place information for each of the five timing classification folders. For example, the visit spot folders C1 and C2 in FIG. 7 are the folders that store the arrival place information whose arrival place is "Kiyomizu Temple" and "Gotenba Outlet." In FIG. 7, the visit spot folder C1 is described as "1000 times at Kiyomizu Temple". In other words, 1000 pieces of arrival place information whose arrival place is "Kiyomizu Temple" are stored in the visit spot folder C1.

In S440, the control device 35 tallies the spots visited prior to returning to residential areas after visiting the visit spots set in S430 as stopover spots. Specifically, the control device 35 identifies one or more visit spots visited by the same user and a visit order in which the same user has visited one or more visit spots based on the user identification information, the arrival place, and the arrival time indicated by the multiple pieces of arrival place information accumulated in the data storage device 32. As a result, the arrival place information having the visit spot as the arrival place and the arrival place information having the stopover spot as the arrival place are identified for the same user. The arrival place information having the stopover spot as the arrival place is stored in the corresponding stopover spot folder. The stopover spot folder is associated with the visit spot folder. In FIG. 7, the stopover spot folders D1 and D2 are associated with the visit spot folder C1, and the stopover spot folder D3 is associated with the visit spot folder C2. For example, "560 times at Kinkaku Temple" is described in the stopover spot folder D1. In other words, 560 pieces of arrival place information are stored in the stopover spot folder D1 in the case of visiting Kiyomizu Temple and then visiting Kinkaku Temple.

The control device 35 tallies the number of arrival place information stored in the folder for all of the visit spot folder and the stopover spot folder, and stores the tallied value in association with the corresponding folder. The number of arrival place information associated with the visit spot folder is the number of visitors. The number of arrival place information associated with the stopover spot folder is the number of stopover users.

In S440, the control device 35 determines whether an input operation for terminating the recommendation generation process (referred to as a third server end operation) has been performed by the user through the operation input portion 33. In this example, when the third server end operation has not been performed, the control device 35 proceeds to S410. When the third server end operation has been performed, the control device 35 terminates the recommendation generation process.

The procedure of the spot display process executed by the control device 27 of the smartphone 3 will be described. The spot display process is a process repeatedly executed after the destination setting application has started.

Figure 8:
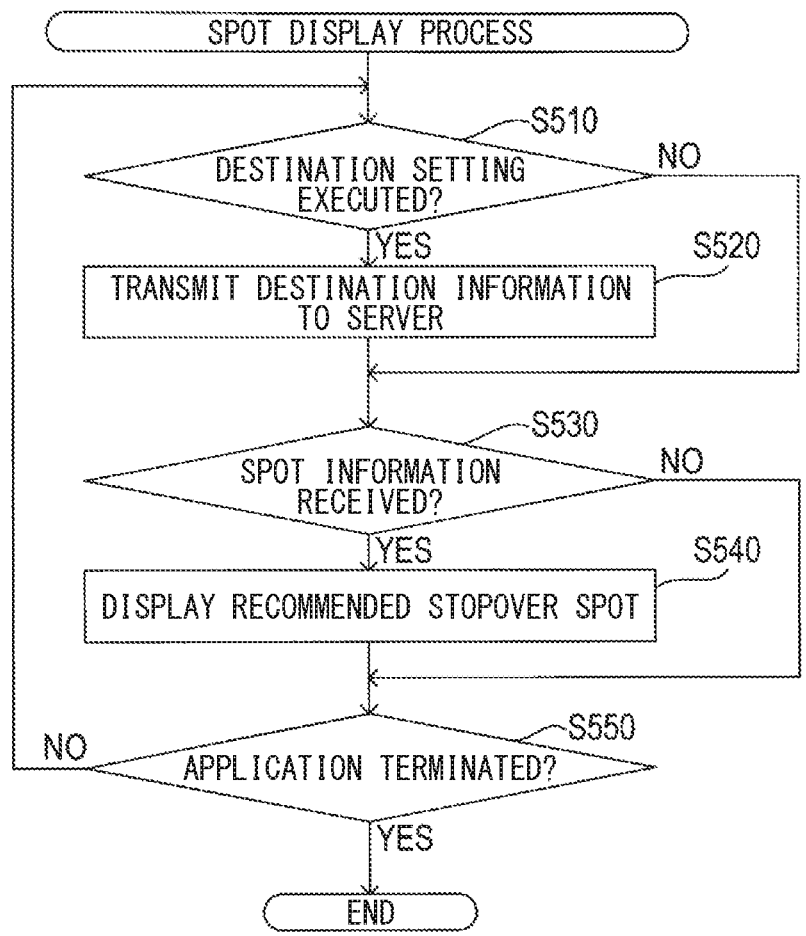
FIG. 8 is a flowchart showing a spot display process.

With the execution of the spot display process, the control device 27 first determines whether the destination setting application has completed the selection of the destination in S510, as shown in FIG. 8. If the selection of the destination has not been completed, the control device 27 proceeds to S530. When the selection of the destination has been completed, the control device 27 transmits the user identification information and the destination information indicating the name and position of the destination selected by the destination setting application from the communication portion 25 to the server 4 in S530 and proceeds to S530.

When proceeding to S530, the control device 27 determines whether spot information has been received from the server 4. If the spot information has not been received, the control device 27 proceeds to S550. When receiving the spot information, the control device 27 displays the position of the recommendation stopover spot indicated by the spot information on the display screen of the display device 21 in S540, and proceeds to S550.

When proceeding to S550, the control device 27 determines whether the destination setting application has been terminated. If the destination setting application has not been terminated, the control device 27 proceeds to S510. When the destination setting application has been terminated, the control device 27 terminates the spot display process.

The procedure of the spot transmission process executed by the control device 35 of the server 4 will be described. The spot transmission process is executed by causing an input operation for starting the spot transmission process to be performed by the user through the operation input portion 33.

Figure 9:
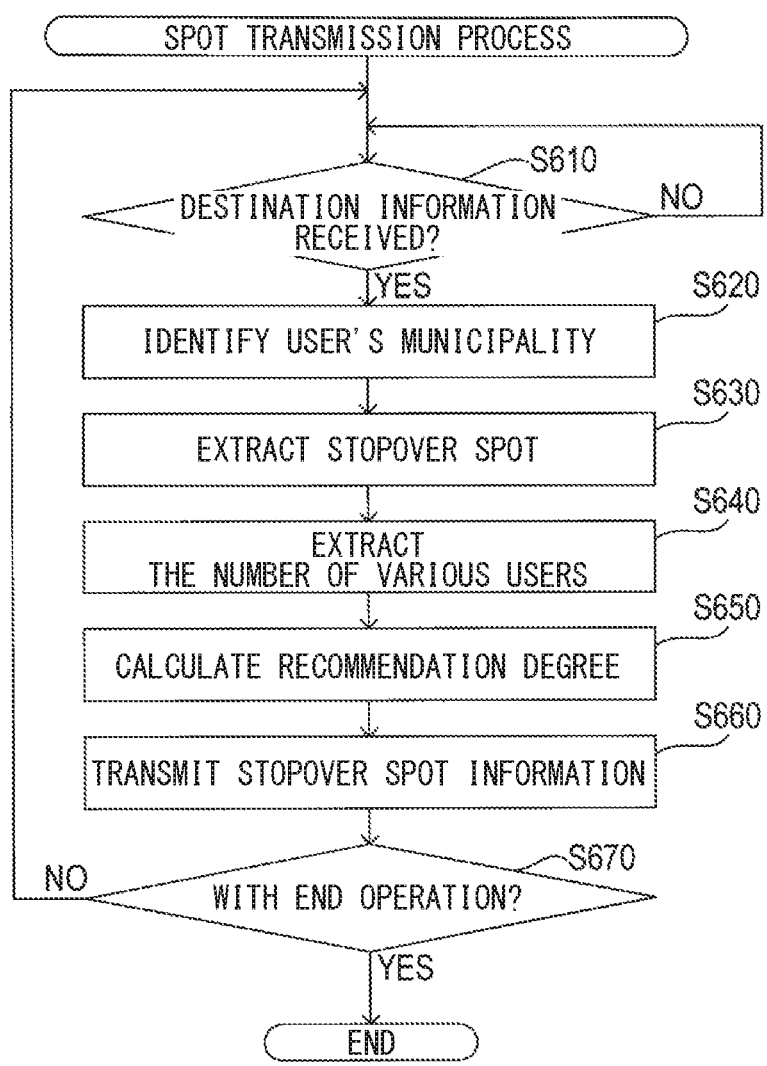
FIG. 9 is a flowchart showing a spot transmission process.

With the execution of the spot transmission process, the control device 35 first determines whether the destination information has been received in S610, as shown in FIG. 9. If the destination information has not been received, the control device 35 repeats the processing in S610 to wait until the destination information is received. When the destination information has been received, the control device 35 identifies, in S620, the municipality unit folders in which the user identification information indicated by the received destination information is stored.

In S630, the control device 35 extracts a stopover spot associated with the same visit spot as the destination indicated by the received destination information. Specifically, the control device 35 first identifies a visit spot folder of the same destination from the municipality unit folder identified in S620 based on the name and position of the destination indicated by the received destination information. Further, the control device 35 identifies the stopover spot folder associated with the identified visit spot folder. Then, the control device 35 extracts the name set in the identified stopover spot folder as the stopover spot.

In S640, the control device 35 extracts the number of users in the same municipality, the number of visitors to the stopover spot (that is, the number of stopover users) and the number of visitors to the visit spot same as the stopover spot. Incidentally, the visit spot same as the stopover spot, which is associated with the same visit spot as the destination indicated by the received destination information, corresponds to stopover candidate visit place. Specifically, the control device 35 first extracts the number of users associated with the municipality unit folder identified in S620. In addition, the control device 35 extracts the number of stopover users associated with the stopover spot folder identified in S630. In addition, the control device 35 extracts the number of visitors associated with the visit spot folder having the same name as the stopover spot identified in S630.

The control device 35 calculates the recommendation degree of the stopover spots in S650.

Specifically, the control device 35 first sets the number of stopover spots associated with the visit spot SV to n, and sets the stopover spots at a point n to stopover spots S(1), S(2), ..., S(n−1), S(n). Incidentally, n is an integer of 1 or more.

It is assumed that the numbers of stopover users to the spots S(1), S(2), ..., SP(n−1), SP(n) through the visit spot SV are VB(1), VB(2), ..., VB(n−1), and VB(n), respectively.

Further, the total number of visitors VB(1), VB(2), ..., VB(n−1), VB(n) is defined as the total number of users VBS.

The number of visitors to the spot S(k) is assumed to be VA(k). k is an integer from 1 to n. Note that the number VA(k) of visitors is the total number of visitors to the spot S(k) which does not consider the presence or absence of a route from another spot.

The number of users in the same municipality is assumed to be SA.

The control device 35 calculates a recommendation degree R(k) of the spot S(k) by the following Expression (1).

$$R(k)=\{VA(k)/SA\}\times\{VB(k)NBS\} \quad \text{Expression (1)}$$

{VA(k)/SA} in Expression (1) is the popularity spot score of the spot S(k). {VB(k)NBS} in Expression (1) is a through-point spot score of the spot S(k).

The control device 35 transmits the stopover spot information indicating the stopover spot corresponding to the highest recommendation degree R(k) among the recommendation degrees R(k) calculated in S650 from the communication portion 34 to the smartphone 3 in S660.

Thereafter, the control device 35 determines whether an input operation for terminating the spot transmission process (referred to as a fourth server end operation) has been performed by the user through the operation input portion 33 in S670. If the fourth server end operation has not been performed, the control device 35 proceeds to S610. When the fourth server end operation has been performed, the control device 35 terminates the spot transmission process.

In this example, a specific example of calculation of the recommendation degree will be described.

Figure 10:
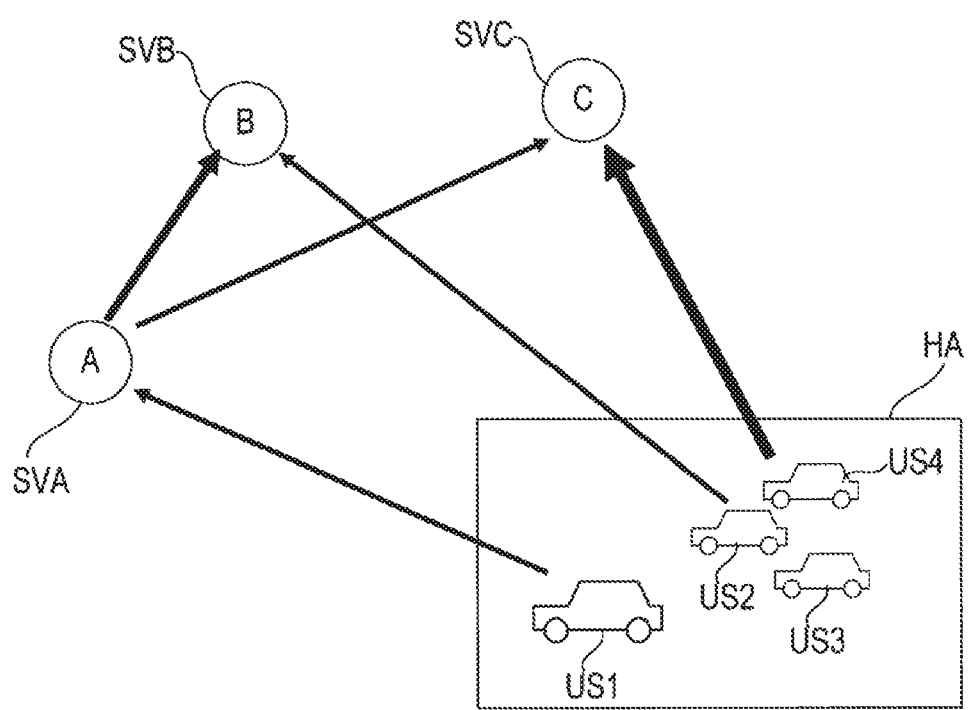
FIG. 10 is a diagram illustrating a specific example of a recommendation degree calculation.

As shown in FIG. 10, it is assumed that spots SVA, SVB, and SVC exist as spots visited by the users US1, US2, US3, and US4 in the same municipal area HA. It is assumed that the number of users in the same municipal area HA is 5,000.

It is assumed that the number of visitors visiting the spots SVA, SVB, and SVC is 500, 200, and 2000, respectively. It is also assumed that the number of visitors visiting the spot SVB through the spot SVA is 300. It is further assumed that the number of visitors visiting the spot SVC through the spot SVA is 50.

In this example, it is assumed that the server 4 calculates the recommendation degrees RB and RC of the spots SVB and SVC when the user US1 visits the spot SVA.

The recommendation degrees RB and RC are calculated by the following Expressions (2) and (3), respectively.

$$RB=(200/5000)\times(300/350)=0.034 \quad \text{Expression (2)}$$

$$RC=(2000/5000)\times(50/350)=0.057 \quad \text{Expression (3)}$$

Since the recommendation degree RC is larger than the recommendation degree RB, the server 4 transmits the stopover spot information recommending the spot SVC as the stopover spot to the vehicle of the user US1.

The server 4 of the recommendation system 1 configured as described above acquires destination information indicating the destination of the user. The data storage device 32 of the server 4 stores the number of visitors for each of the multiple visit spots visited by the multiple users in the past, and further stores the number of stopover users in association with the visit spots for each of one or more stopover spots visited by the users who have visited the visit spots.

The server 4 extracts, as a candidate stopover spot, the stopover spot associated with the same visit spot (referred to as a destination visit spot) as the destination indicated by the acquired destination information.

The server 4 extracts, from the data storage device 32, the number of visitors visiting the visit spot (referred to as a stopover candidate visit spot) that is the same as the stopover spot associated with the destination visit spot among the multiple visit spots, and extracts the number of stopover users of one or more candidate stopover spots from the data storage device 32.

The server 4 calculates a popularity spot score for each of one or more candidate stopover spots based on the extracted number of visitors. Further, the server 4 calculates the through-point spot score based on the extracted number of stopover users. Further, the server 4 calculates the recommendation degree based on the calculated popularity spot score and the through-point spot score.

The server 4 selects one candidate stopover spot as a stopover spot to be recommended to the user based on the calculated one or more recommendation degrees.

The server 4 transmits the stopover spot information indicating the selected candidate stopover spot to the smartphone 3 by data communication.

In this manner, the server 4 selects the stopover spot to be recommended to the user in consideration of not only the frequency at which the multiple users have visited the candidate stopover spot through the destination visit spot, but also the frequency at which the multiple users have visited the candidate stopover spot regardless of whether to pass through the destination visit spot (that is, the popularity of the candidate stopover spot). For that reason, the server 4 often recommends a highly popular stopover spot, and can increase the frequency at which the user is glad to stop at the stopover spot recommended by the server 4. As a result, the server 4 can improve the possibility of recommending a visit spot useful to the user.

The data storage device 32 classifies and stores the number of visitors and the number of stopover users for each of the multiple municipalities set in advance based on the places of the residence of the users. The destination information further includes user identification information for identifying the place of the residence of the user. Then, the server 4 extracts the number of visitors and the number of stopover users classified into municipalities identified by the user identification information indicated by the acquired destination information. As a result, the server 4 can recommend the stopover spot in consideration of the easiness of returning to the place of the residence.

The data storage device 32 stores the number of visitors and the number of stopover users from four months ago to the current time. This allows the server 4 to recommend a stop spot based on the latest stopover frequency to the candidate stop spot and the latest popularity of the candidate stopover spot.

The data storage device 32 classifies and stores the number of visitors and the number of stopover users for each season the user has visited. As a result, the server 4 can recommend an appropriate stopover spot according to the season.

The server 4 calculates the recommendation degree by multiplying the popularity spot score by the through-point spot score. As a result, the server 4 can easily calculate the recommendation degree, and can reduce a processing load of the server 4.

In the embodiment described above, the recommendation system 1 corresponds to a recommendation system, the server 4 corresponds to a recommendation apparatus, the communication portion 34 corresponds to a destination acquisition portion, and the data storage device 32 corresponds to a storage device.

S630 corresponds to a process as a stopover place extraction section. S640 corresponds to a process as a user number extraction section. S650 corresponds to a process as a recommendation degree calculation section and a selection section. S660 corresponds to a process as a recommendation transmission section.

The visit spot corresponds to a visit place, the stopover spot corresponds to a stopover place, the recommendation degree corresponds to a recommendation degree, the municipality corresponds to a residence area, the user identification information corresponds to a residence identification information, and the four months corresponds to a storage period.

One embodiment of the present disclosure has been described above. The present disclosure is not limited to the above embodiment, and various modifications may be made to implement the present disclosure.

The server 4 and method thereof described in the present disclosure may be implemented by a special purpose computer which is configured with a memory and a processor programmed to execute one or more particular functions embodied in computer programs of the memory. Alternatively, the server 4 described in the present disclosure and the method thereof may be realized by a dedicated computer configured as a processor with one or more dedicated hardware logic circuits. Alternatively, the server 4 and method described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as computer executable instructions. The technique for realizing the functions of the respective sections included in the server 4 does not necessarily need to include software, and all of the functions may be realized with the use of one or multiple hardware.

The multiple functions of one component in the above embodiment may be realized by multiple components, or a function of one component may be realized by the multiple components. In addition, multiple functions of multiple components may be realized by one component, or a single function realized by multiple components may be realized by one component. In addition, a part of the configuration of the above embodiment may be omitted. At least a part of the configuration of the above embodiment may be added to or substituted for the configuration of the other above embodiment.

In addition to the server 4 described above, the present disclosure may be implemented in various forms, such as a system including the server 4 as a component, a program for causing a computer to function as the server 4, a non-transitory tangible storage medium such as a semiconductor memory in which the program is recorded, and an recommendation method.

The control and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or a processing of the flowchart in the present application includes steps (also referred to as sections), each of which is represented, for example, as S10. Further, each step may be divided into several sub-steps, and several steps may be combined into a single step.

While various embodiments, configurations, and aspects of a recommendation apparatus and a recommendation system according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A recommendation apparatus comprising:
   a server having a processor and memory configured to:
   acquire destination information indicative of a destination of a user;
   store in a storage medium
   each of a plurality of visit places visited by a plurality of users in the past and a total number of visitors, which is a total number of users from the plurality of users who have visited the visit place, and
   each of one or more stopover places visited by the users from the plurality of users after having visited the visit place and a total number of stopover users, which is a total number of users from the plurality of users who have visited the stopover place after having visited the visit place;
   generate a database in the storage medium that includes (i) the plurality of visit places, (ii) the total number of visitors who have visited the plurality of visit places, (iii) the stopover places visited by the users after having visited the plurality of visit places, and (iv) the total number of stopover users who have visited the stopover places in correlation with user identification information for each user, an arrival time to each of the plurality of visit places, and an arrival time to each of the stopover places;
   extract, as a candidate stopover place, the stopover place associated with a destination visit place as the visit place, the destination visit place being identical to the destination indicated by the acquired destination information;

extract a total number of visitors of one or more stopover candidate visit places from the storage medium, each stopover candidate visit place from the one or more stopover candidate visit places being the visit place which is identical with the stopover place associated with the destination visit place among the plurality of visit places;

extract a total number of stopover users of one or more of the candidate stopover places from the storage medium;

calculate, for each of the one or more candidate stopover places, a popularity spot score based on the total number of visitors extracted, the popularity spot score corresponding to a number of times the plurality of users have visited the candidate stopover places;

calculate a through-point spot score based on the total number of stopover users extracted, the through-point spot score corresponding to a number times the plurality of users have visited the candidate stopover places after having visited the destination visit places;

calculate a recommendation degree based on the calculated popularity spot score and the calculated through-point spot score, the recommendation degree indicating a degree of recommending the candidate stopover place to the user who visits the destination visit place; and select the one or more candidate stopover places as the stopover place to be recommended to the user, based on the calculated one or more recommendation degrees.

2. The recommendation apparatus according to claim 1, wherein:

the storage medium classifies and stores the number of visitors and the number of stopover users for each of a plurality of residential areas set in advance based on a place of residence of the user;

the destination information further includes residence identification information for identifying the place of the residence of the user; and the processor and memory of the server are further configured to extract the number of visitors and the number of stopover users classified into the residential area identified by the residence identification information.

3. The recommendation apparatus according to claim 1, wherein:

the storage medium stores
the number of visitors at the visit place visited by the users from a preset storage period ago to a present time, and
the number of stopover users at the stopover place visited by the users from the storage period ago to the present time.

4. The recommendation apparatus according to claim 1, wherein:

the storage medium classifies and stores the number of visitors and the number of stopover users for each season when the users visit.

5. The recommendation apparatus according to claim 1, wherein:

the processor and memory of the server are further configured to calculate the recommendation degree by multiplying the popularity spot score by the through-point spot score.

6. A recommendation system comprising:

a mobile terminal; and a server having a processor and memory configured to:
perform data communication with the mobile terminal;
acquire destination information indicative of a destination of a user;
store in a storage medium
each of a plurality of visit places visited by a plurality of users in the past and a total number of visitors, which is a total number of users from the plurality of users who have visited the visit place, and
each of one or more stopover places visited by the users from the plurality of users after having visited the visit place and a total number of stopover users, which is a total number of users from the plurality of users who have visited the stopover place after having visited the visit place;
generate a database in the storage medium that includes (i) the plurality of visit places, (ii) the total number of visitors who have visited the plurality of visit places, (iii) the stopover places visited by the users after having visited the plurality of visit places, and (iv) the total number of stopover users who have visited the stopover places in correlation with user identification information for each user, an arrival time to each of the plurality of visit places, and an arrival time to each of the stopover places;
extract, as a candidate stopover place, the stopover place associated with a destination visit place as the visit place, which is identical with the destination indicated by the acquired destination information;
extract a total number of visitors of one or more of stopover candidate visit places from the storage medium, the stopover candidate visit place being the visit place which is identical with the stopover place associated with the destination visit place among the plurality of visit places;
extract a total number of stopover users of one or more of the candidate stopover places from the storage medium;
calculate, for each of the one or more candidate stopover places, a popularity spot score based on the total number of visitors extracted, the popularity spot score corresponding to a number of times the plurality of users have visited the candidate stopover places;
calculate a through-point spot score based on the total number of stopover users extracted, the through-point spot score corresponding to a number of times the plurality of users have visited the candidate stopover places after having visited the destination visit places;
calculate a recommendation degree based on the calculated popularity spot score and the calculated through-point spot score, the recommendation degree indicating a degree of recommending the candidate stopover place to the user who visits the destination visit place;
select the one or more candidate stopover places as the stopover place to be recommended to the user, based on the one or more calculated recommendation degrees; and transmit recommendation information indicating the selected candidate stopover place to the mobile terminal by the data communication.

* * * * *